(12) United States Patent
Kitao et al.

(10) Patent No.: US 9,972,848 B2
(45) Date of Patent: May 15, 2018

(54) METHOD FOR PRODUCING FINE CATALYST PARTICLES AND METHOD FOR PRODUCING CARBON-SUPPORTED CATALYST

(71) Applicant: TOYOTA JIDOSHA KABUSHIKI KAISHA, Toyota-shi, Aichi-ken (JP)

(72) Inventors: Noriyuki Kitao, Shizuoka-ken (JP); Hiroko Kimura, Susono (JP); Makoto Adachi, Numazu (JP); Keiichi Kaneko, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/302,006

(22) PCT Filed: Feb. 13, 2015

(86) PCT No.: PCT/JP2015/053933
§ 371 (c)(1),
(2) Date: Oct. 5, 2016

(87) PCT Pub. No.: WO2015/156027
PCT Pub. Date: Oct. 15, 2015

(65) Prior Publication Data
US 2017/0117554 A1  Apr. 27, 2017

(30) Foreign Application Priority Data
Apr. 11, 2014  (JP) .................................. 2014-081897

(51) Int. Cl.
*H01M 4/88* (2006.01)
*H01M 4/92* (2006.01)
(Continued)

(52) U.S. Cl.
CPC ....... *H01M 4/8657* (2013.01); *H01M 4/8853* (2013.01); *H01M 4/923* (2013.01); *H01M 4/926* (2013.01)

(58) Field of Classification Search
CPC ........................... H01M 4/8853; H01M 4/925
See application file for complete search history.

(56) References Cited

U.S. PATENT DOCUMENTS

| 7,479,469 B2 | 1/2009 | Ishihara et al. |
| 8,361,924 B2 | 1/2013 | Tanaka et al. |

(Continued)

FOREIGN PATENT DOCUMENTS

| JP | 2014-128756 A | 7/2014 |
| JP | 2015-047536 A | 3/2015 |

(Continued)

OTHER PUBLICATIONS

USPTO, Restriction Requirement issued in U.S. Appl. No. 14/979,292, dated Dec. 6, 2016, 6 pages.

(Continued)

*Primary Examiner* — Bryan D. Ripa
(74) *Attorney, Agent, or Firm* — Hunton Andrews Kurth LLP

(57) ABSTRACT

The present invention is to provide fine catalyst particles with better catalytic performance than ever before and a carbon-supported catalyst with better catalytic performance than ever before. Disclosed is a method for producing fine catalyst particles, comprising: a potential applying step of applying a potential to the fine palladium-containing particles in a first dispersion, until a peak indicating a Pd{111} surface in a reduction wave of a cyclic voltammogram becomes larger than a peak indicating a Pd{110} or Pd{100} surface in the reduction wave of the cyclic voltammogram; a copper covering step of covering at least part of the fine (Continued)

palladium-containing particle with copper by preparing a second dispersion by mixing the first dispersion and a copper-containing solution after the potential applying step, and applying a potential that is nobler than the oxidation-reduction potential of copper to the fine palladium-containing particles in the second dispersion; and a platinum covering step of covering at least part of the fine palladium-containing particle with platinum by mixing the second dispersion and a platinum-containing solution after the copper covering step.

3 Claims, 10 Drawing Sheets

(51) Int. Cl.
*C23C 18/38* (2006.01)
*H01M 4/86* (2006.01)

(56) References Cited

U.S. PATENT DOCUMENTS

| | | | |
|---|---|---|---|
| 9,163,041 B2 | 10/2015 | Wan | |
| 2010/0177462 A1 | 7/2010 | Adzic et al. | |
| 2011/0155579 A1* | 6/2011 | Wang | B01J 21/18 |
| | | | 205/103 |
| 2012/0010069 A1* | 1/2012 | Takehiro | B01J 13/02 |
| | | | 502/5 |
| 2012/0046164 A1 | 2/2012 | Tanaka et al. | |
| 2012/0245019 A1* | 9/2012 | Adzic | B82Y 30/00 |
| | | | 502/5 |
| 2012/0321996 A1 | 12/2012 | Ito | |
| 2013/0022899 A1* | 1/2013 | Arai | C23C 18/31 |
| | | | 429/524 |
| 2013/0029842 A1 | 1/2013 | Kimura et al. | |
| 2013/0324391 A1* | 12/2013 | Shao | H01M 4/921 |
| | | | 502/5 |
| 2014/0106260 A1 | 4/2014 | Cargnello et al. | |
| 2014/0178575 A1 | 6/2014 | Iio et al. | |
| 2014/0200133 A1 | 7/2014 | Kimura et al. | |
| 2014/0217328 A1 | 8/2014 | Daly et al. | |
| 2015/0011655 A1 | 1/2015 | Jurczakowski et al. | |
| 2015/0318560 A1* | 11/2015 | Kaneko | H01M 4/8657 |
| | | | 502/5 |
| 2016/0218370 A1 | 7/2016 | Kitao et al. | |
| 2016/0218372 A1 | 7/2016 | Nanba | |
| 2016/0260984 A1 | 9/2016 | Yamada et al. | |

FOREIGN PATENT DOCUMENTS

| | | |
|---|---|---|
| JP | 2015-077580 A | 4/2015 |
| JP | 2016-073895 A | 5/2016 |
| WO | 2016/051960 A1 | 4/2016 |

OTHER PUBLICATIONS

USPTO, Office Action issued in U.S. Appl. No. 14/979,292, dated May 8, 2017, 20 pages.
USPTO, Notice of Allowance issued in U.S. Appl. No. 14/979,292, dated Oct. 20, 2017, 12 pages.

* cited by examiner

US 9,972,848 B2

METHOD FOR PRODUCING FINE CATALYST PARTICLES AND METHOD FOR PRODUCING CARBON-SUPPORTED CATALYST

CROSS-REFERENCE TO RELATED APPLICATIONS

This is a national phase application based on the PCT International Patent Application No. PCT/JP2015/053933 filed Feb. 13, 2015, claiming priority to Japanese Patent Application No. 2014-081897 filed Apr. 11, 2014, the entire contents of both of which are incorporated herein by reference.

TECHNICAL FIELD

The present invention relates to a method for producing fine catalyst particles with better catalytic performance than ever before and a method for producing a carbon-supported catalyst with better catalytic performance than ever before.

BACKGROUND ART

As an electrode catalyst for the anode and cathode of a fuel cell, a technique relating to fine catalyst particles is known, which have a structure that includes a core particle and an outermost layer covering the core particle (so-called "core-shell structure"). For the fine catalyst particles, the cost of the inside of the particles, which hardly participates in a catalyst reaction, can be reduced by the use of a relatively inexpensive material for the core particle.

A method for producing a core-shell catalyst is disclosed in Patent Document 1, in which a copper shell layer is produced by the Cu-underpotential deposition method (Cu-UPD) and then the copper shell layer is substituted with noble metal atoms.

CITATION LIST

Patent Document 1: U.S. Unexamined Patent Application Publication No. 2010/0177462

SUMMARY OF INVENTION

Technical Problem

In Patent Document 1, a method for producing a copper monoatomic layer on a core surface by Cu-UPD is disclosed, the method using a mixed solution of 50 mM $CuSO_4$ and 50 mM $H_2SO_4$. However, according to the research conducted by the inventors of the present invention, it was found that a core-shell catalyst in which the shell includes many defects is obtained when Cu-UPD is simply carried out on the core surface that is, like the invention of Patent Document 1, not subjected to any treatment.

The present invention was achieved in light of the above circumstance. An object of the present invention is to provide a method for producing fine catalyst particles with better catalytic performance than ever before and a method for producing a carbon-supported catalyst with better catalytic performance than ever before.

Solution to Problem

The fine catalyst particle production method of the present invention is a method for producing fine catalyst particles comprising a fine palladium-containing particle and a platinum-containing outermost layer covering at least part of the fine palladium-containing particle, wherein the method comprises: a potential applying step of applying a potential to the fine palladium-containing particles in a first dispersion comprising fine palladium-containing particles being dispersed in an acid solution and having an average particle diameter of 3.0 nm or more and 6.0 nm or less, until a peak indicating a Pd{111} surface in a reduction wave of a cyclic voltammogram becomes larger than a peak indicating a Pd{110} or Pd{100} surface in the reduction wave of the cyclic voltammogram; a copper covering step of covering at least part of the fine palladium-containing particle with copper by preparing a second dispersion by mixing the first dispersion and a copper-containing solution after the potential applying step, and applying a potential that is nobler than the oxidation-reduction potential of copper to the fine palladium-containing particles in the second dispersion; and a platinum covering step of covering at least part of the fine palladium-containing particle with platinum by substituting the copper covering at least part of the fine palladium-containing particle with platinum by mixing the second dispersion and a platinum-containing solution after the copper covering step.

In the potential applying step of the present invention, it is preferable that the potential is swept in a range including at least 1.2 V (vs. RHE).

The carbon-supported catalyst production method of the present invention is a method for producing a carbon-supported catalyst in which the fine catalyst particles are supported on a carbon support, wherein fine palladium-containing particles configured for use in the potential applying step are supported on a carbon support.

Advantageous Effects of Invention

According to the present invention, by sufficiently growing a more electrochemically stable Pd{111} surface in the potential applying step, the Pd{111} surface is covered with platinum in the platinum covering step to form a Pt{111} surface and, as a result, the Pt{111} surface, which has higher catalytic activity, appears on the platinum outermost layer surface at a high rate; therefore, fine catalyst particles with better catalytic performance than conventional core-shell catalysts can be obtained.

DESCRIPTION OF EMBODIMENTS

Figure 1:
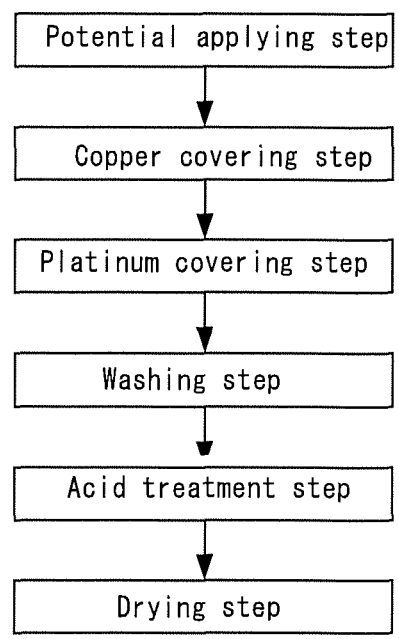
FIG. 1 is a flow chart of an example of the carbon-supported catalyst production method of the present invention.

The fine catalyst particle production method of the present invention is a method for producing fine catalyst particles comprising a fine palladium-containing particle and a platinum-containing outermost layer covering at least part of the fine palladium-containing particle, wherein the method comprises: a potential applying step of applying a potential to the fine palladium-containing particles in a first dispersion comprising fine palladium-containing particles being dispersed in an acid solution and having an average particle diameter of 3.0 nm or more and 6.0 nm or less, until a peak indicating a Pd{111} surface in a reduction wave of a cyclic voltammogram becomes larger than a peak indicating a Pd{110} or Pd{100} surface in the reduction wave of the cyclic voltammogram; a copper covering step of covering at least part of the fine palladium-containing particle with copper by preparing a second dispersion by mixing the first dispersion and a copper-containing solution after the potential applying step, and applying a potential that is nobler than the oxidation-reduction potential of copper to the fine palladium-containing particles in the second dispersion; and a platinum covering step of covering at least part of the fine palladium-containing particle with platinum by substituting the copper covering at least part of the fine palladium-containing particle with platinum by mixing the second dispersion and a platinum-containing solution after the copper covering step.

As described above, Cu-UPD has been used to form the shell of a core-shell catalyst. In conventional methods, however, a commercially-available palladium-supported carbon (hereinafter may be referred to as Pd/C) is mainly used as it is for Cu-UPD, and the fine core particle surface at an earlier stage than Cu-UPD has not been considered at all.

However, by research studies conducted by the inventors of the present invention, it was found that when a commercially-available Pd/C is used as it is for Cu-UPD, shell formation is not sufficiently promoted and results in a defective shell. This is because palladium oxide and/or an organic substance is present on the fine palladium particle surface in a commercially-available Pd/C, or many low-coordinated atoms are present thereon, due to the following reasons.

In the preparation of Pd/C, an organic dispersant or the like is generally used to control the particle diameter or dispersibility of fine palladium particles. In the Pd/C preparation, palladium metalation is finally carried out by firing a Pd/C precursor at a temperature of about 300 to 600° C. However, such a temperature condition is likely to leave organic substance residues in Pd/C. In general, palladium oxide is present near the surface of fine palladium particles in a commercially-available Pd/C. However, the palladium oxide is not sufficiently reduced in the above firing condition. As just described, in a commercially-available Pd/C, since the fine palladium particle surface is covered with an oxide or organic substance, sufficient adsorption of copper to the fine palladium particle surface is not promoted upon Cu-UPD.

In the fired Pd/C, many low-coordinated palladium atoms are present on the fine palladium particle surface, in addition to crystal surfaces such as a Pd{111} surface, a Pd{110} surface and a Pd{100} surface. The low-coordinated palladium atoms are palladium atoms constituting a corner or an edge. More specifically, they mean palladium atoms present on a border between two of the surfaces of the fine palladium particle surface, or palladium atoms present on an apex of the fine palladium particle surface. Meanwhile, high-coordinated palladium atoms mean palladium atoms constituting the crystal surfaces of the fine palladium particle surface, and palladium atoms present inside the fine palladium particle.

As just described, there is such a problem with prior-art techniques, that since most of the fine palladium particle surface is composed of low-coordinated palladium atoms, exposure of highly-active crystal surfaces is small and many convexities and concavities appear on the surface, resulting in low activity of the core-shell catalyst obtained through Cu-UPD.

In the present invention, the crystal surfaces of palladium are each described by a combination of chemical formula "Pd" with the crystal surface. In this Description, equivalent surfaces are described as a crystal surface enclosed in curly brackets. For example, Pd(111) surface and Pd(-1-1-1) surface are all described as Pd{111} surface.

Without any increase in the surface activity of the fine palladium-containing particles, a sufficient amount of copper does not adsorb to the fine palladium-containing particle surface in Cu-UPD, and substitution of copper atoms with platinum atoms, etc., is less likely to proceed in the subsequent platinum-containing outermost layer formation, so that fine catalyst particles with a highly defective platinum-containing outermost layer are obtained. The inventors of the present invention focused on this fact and made research studies on increasing the surface activity of the fine palladium-containing particles. As a result of the efforts, they found a method for increasing the activity of the fine catalyst particles obtained through Cu-UPD higher than ever before, by carrying out a step of applying a potential to the fine palladium-containing particles at an earlier stage than Cu-UPD to remove oxides and impurities from the fine palladium-containing particle surface, and by modifying atomic arrangement on the fine palladium-containing particle surface to expose Pd{111} with high catalytic activity. As a result, they achieved the present invention.

FIG. 1 is a flow chart of an example of the fine catalyst particle production method of the present invention.

The fine catalyst particle production method shown in FIG. 1 includes (1) the potential applying step, (2) the copper covering step, (3) the platinum covering step, (4) a washing step, (5) an acid treatment step and (6) a drying step.

The fine catalyst particle production method of the present invention includes (1) the potential applying step, (2) the copper covering step and (3) the platinum covering step. As needed, it includes (4) a washing step, (5) an acid treatment step, (6) a drying step, etc., after the platinum covering step.

Hereinafter, these steps will be described in order.

(1) Potential Applying Step

The potential applying step is a step of applying a potential to the fine palladium-containing particles in a first dispersion comprising fine palladium-containing particles being dispersed in an acid solution and having an average particle diameter of 3.0 nm or more and 6.0 nm or less, until a peak indicating a Pd{111} surface in a reduction wave of a cyclic voltammogram becomes larger than a peak indicating a Pd{110} or Pd{100} surface in the reduction wave of the cyclic voltammogram.

In the present invention, "fine palladium-containing particle" is a general term for fine palladium particle and fine palladium alloy particle.

As will be described below, the outermost layer covering the fine palladium-containing particle contains platinum. Platinum is excellent in catalytic activity, especially in oxygen reduction reaction (ORR) activity. While the lattice constant of platinum is 3.92 Å, the lattice constant of palladium is 3.89 Å, and this is a value that is within a range of 5% either side of the lattice constant of platinum. Accordingly, no lattice mismatch occurs between platinum and palladium, and palladium is sufficiently covered with platinum.

In the present invention, from the viewpoint of cost reduction, it is preferable that the fine palladium-containing particles contain a metal material that is less expensive than the below-described material which is used for the platinum-containing outermost layer. It is more preferable that the fine palladium-containing particles contain a metal material which is able to impart electroconductivity.

In the present invention, from the above viewpoint, it is preferable that the fine palladium-containing particles are fine palladium particles or particles of an alloy of palladium and a metal such as cobalt, iridium, rhodium or gold. In the case of using palladium alloy particles, the palladium alloy particles can contain palladium and only one kind of metal, or they can contain palladium and two or more kinds of metals.

The average particle diameter of the fine palladium-containing particles used in the present invention is 3.0 nm or more and 6.0 nm or less. When the average particle diameter of the fine palladium-containing particles is less than 3.0 nm, the proportion of the low-coordinated palladium atoms on the fine palladium-containing particle surface is high, so that the low-coordinated palladium atoms may be eluted in the potential applying step. On the other hand, when the average particle diameter of the fine palladium-containing particles is more than 6.0 nm, the surface energy of the fine palladium-containing particles is small, and the fine palladium-containing particles themselves are stable, so that rearrangement of the atoms on the particle surface does not sufficiently proceed even after the potential applying step, and the Pd{111} surface may not grow sufficiently.

The average particle diameter of the fine palladium-containing particles is preferably 3.5 nm or more and is preferably 5.5 nm or less.

In the present invention, the average particle diameter of the fine palladium-containing particles, the fine catalyst particles and the carbon-supported catalyst is calculated by a conventional method. An example of the method for calculating the average particle diameter of the fine palladium-containing particles, the fine catalyst particles and the carbon-supported catalyst is as follows. First, for a particle shown in a TEM image at a magnification of 400,000 to 1,000,000×, the particle diameter is calculated, on the assumption that the particle is spherical. Such a particle diameter calculation by TEM observation is carried out on 200 to 500 particles of the same type, and the average of the particles is regarded as the average particle diameter.

In the case of producing the carbon-supported catalyst in which the fine catalyst particles are supported on a carbon support, it is preferable that fine palladium-containing particles supported on a carbon support are used in this step. By the use of the carbon support, when the carbon-supported catalyst is used in the electrocatalyst layer of a fuel cell, electroconductivity can be provided to the electrocatalyst layer.

Concrete examples of carbonaceous materials that can be used as the carbon support include electroconductive carbonaceous materials including carbon particles and carbon fibers, such as: Ketjen Black (product name; manufactured by: Ketjen Black International Company), Vulcan (product name; manufactured by: Cabot), Norit (product name; manufactured by: Norit), Black Pearls (product name; manufactured by: Cabot), Acetylene Black (product name; manufactured by: Chevron) and OSAB (product name: manufactured by: Denka Co., Ltd.)

The acid solution is used in the potential applying step. The acid solution is not particularly limited, as long as it is a solution that is able to, by an appropriate potential sweep in the acid solution, remove palladium oxide and impurities from the fine palladium-containing particle surface and sufficiently grow the Pd{111} surface of the fine palladium-containing particle surface.

As the acid solution used in the potential applying step, more specifically, an acid solution that is similar to an acid solution that can be used in the below-described copper-containing solution, can be used.

In the case of carrying out the potential applying step and the below-described copper covering step in the same reaction container, the copper-containing solution can be added to the electrolyte used in the potential applying step. For example, when sulfuric acid is used as the electrolyte of the potential applying step, a copper sulfate aqueous solution can be added to the used sulfuric acid and used in the copper covering step.

From the viewpoint of removing oxygen as much as possible from the acid solution and promoting quick oxide removal, it is preferable to bubble nitrogen into the acid solution.

The first dispersion comprising the fine palladium-containing particles being dispersed in the acid solution and having the above-specified average particle diameter, may be a dispersion prepared in advance or a commercially-available product. In the case of preparing the first dispersion, the preparation method can be a well-known method.

A main characteristic of the present invention is applying the potential to the fine palladium-containing particles in the first dispersion, until the peak indicating the Pd{111} surface in the reduction wave of the cyclic voltammogram becomes larger than the peak indicating the Pd{110} or Pd{100} surface in the reduction wave of the cyclic voltammogram.

A cyclic voltammogram is a current-potential curve that appears by a potential sweep, with current on the vertical axis and potential on the horizontal axis. In general, positive current is defined as oxidation current, and negative current is defined as reduction current. Therefore, the reduction wave of the cyclic voltammogram refers to a negative current wave.

In the present invention, the cyclic voltammogram can be obtained at the same time as the application of the potential, or it can be obtained separately from the application of the potential.

In the case of obtaining the cyclic voltammogram at the same time as the application of the potential, examples include the case where cyclic voltammetry is carried out with an appropriate potential sweep.

Figure 2:
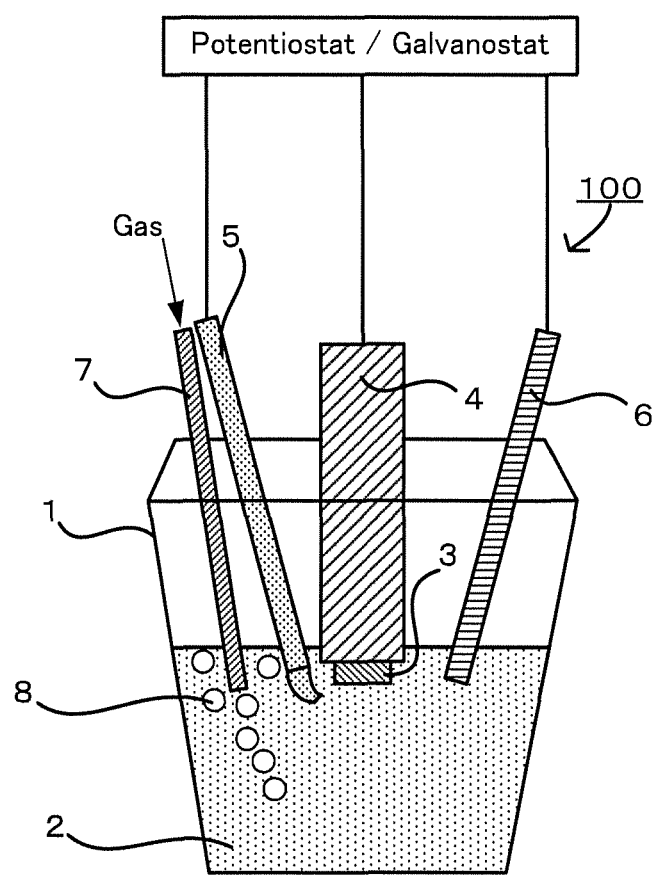
FIG. 2 is a schematic perspective view of an example of an electrochemical device used for cyclic voltammetry.

In the case of obtaining the cyclic voltammogram separately from the application of the potential, examples include a case where an appropriate amount of sample is taken from the first dispersion in the potential applying step, and cyclic voltammetry is carried out on the sample by a device shown in FIG. 2, etc., for monitoring.

FIG. 2 is a schematic perspective view of an example of an electrochemical device used for cyclic voltammetry. An electrochemical device 100 include a glass cell 1, an electrolyte 2 added in the cell, a dispersion 3 (the first dispersion) and a working electrode 4 having the first dispersion 3 (about 10 µL) applied thereto. In the glass cell 1, the working electrode 4, a reference electrode 5 and a counter electrode 6 are placed so that they are sufficiently immersed in the electrolyte 2, and the three electrodes are electrically connected to a potentiostat/galvanostat. A gas inlet tube 7 is placed so that it is immersed in the electrolyte 2. At room temperature, an inert gas is bubbled into the electrolyte 2 from an inert gas supply source (not shown) placed outside the cell for a certain period of time to saturate the electrolyte 2 with the inert gas. Bubbles 8 indicate the bubbles of the inert gas. As the inert gas, nitrogen, argon or a mixed gas thereof can be used. Then, the cyclic voltammetry is carried out.

As the working electrode, a measurement electrode made of an electroconductive material can be used, such as a glassy carbon electrode. In the case of carrying out the cyclic voltammetry of the carbon-supported catalyst using an RDE as the working electrode, from the viewpoint of potential stability, the cyclic voltammetry is preferably carried out after immersing the RDE in an electrolyte, rotating the RDE in the electrolyte, and stopping the rotation few minutes after the immersion.

As the reference electrode, a reversible hydrogen electrode (hereinafter may be referred to as RHE) which is used by injecting hydrogen into platinum, or a silver-silver chloride electrode is used. In the case of converting a measurement value for the silver-silver chloride electrode into a value for the reversible hydrogen electrode, the potential difference between the RHE and the silver-silver chloride electrode is measured in advance and corrected later.

As the counter electrode, a platinum electrode or the like can be used.

The conditions of the cyclic voltammetry are preferably conditions that do not cause a deterioration in the fine palladium-containing particles or a deterioration in the support (carbon). A concrete example of the conditions of the cyclic voltammetry for monitoring using the RDE is as follows.

Electrolyte: 0.1 M perchloric acid aqueous solution (subjected to inert gas bubbling)
Atmosphere: Under inert gas atmosphere
Sweep rate: 50 mV/sec
Potential sweep range (potential window): 0.35 to 0.70 V (vs. RHE)
Reference electrode: Reversible hydrogen electrode (RHE)

The peak indicating the Pd{111} surface is a peak that appears in a range of 0.50 V to 0.55 V (vs. RHE) in the reduction wave of the cyclic voltammogram, depending on the cyclic voltammetry conditions.

In the present invention, applying the potential "until the peak indicating the Pd{111} surface in the reduction wave of the cyclic voltammogram becomes larger than the peak indicating the Pd{110} or Pd{100} surface in the reduction wave of the cyclic voltammogram" means applying the potential to the fine palladium-containing particles in which the Pd{111} surface does not appear at all on the fine palladium-containing particle surface at an earlier stage than the potential applying step, or to the fine palladium-containing particles in which the proportion of the Pd{111} surface in the surface area is small, until the proportion of the Pd{111} surface in the surface area becomes larger than the proportion of the Pd{110} or Pd{100} surface and the Pd{111} surface sufficiently grows. The peak that appears in the reduction wave of the cyclic voltammogram is an indicator of the degree of the growth of the Pd{111} surface. In the present invention, the potential applying step is terminated when the peak indicating the Pd{111} surface becomes larger than the peak indicating the Pd{110} or Pd{100} surface in the reduction wave. That is, this step is a step of increasing the purity and crystallinity of the fine palladium-containing particle surface.

The size of the peak indicating the Pd{111} surface and the size of the peak indicating the Pd{110} surface and/or the Pd{100} surface can be compared by calculating the areas of these peaks in the reduction wave of the cyclic voltammogram.

An example of the application of the potential "until the peak indicating the Pd{111} surface in the reduction wave of the cyclic voltammogram becomes larger than the peak indicating the Pd{110} or Pd{100} surface in the reduction wave of the cyclic voltammogram" is a method of sweeping a potential repeatedly in a wide potential range. The wide potential range indicates such a potential range that palladium enters a reduction state on at least the lower limit of the potential range and palladium enters an oxidation state on at least the upper limit of the potential range. As just described, by repeating the palladium reduction condition and the palladium oxidation condition alternately by the potential sweep, oxygen and impurities on the fine palladium-containing particle surface can be removed, and the arrangement of the palladium atoms on at least the fine palladium-containing particle surface can be modified. As a result, the most electrochemically stable Pd{111} surface can be grown on the fine palladium-containing particle surface.

The lower limit of the potential range (hereinafter may be referred to as lower limit potential) is preferably 0.1 V (vs. RHE) or less and more preferably 0.05 V (vs. RHE) or less. Since the oxidation-reduction potential of palladium is 0.915 V (vs. RHE), the lower limit potential may be less than the oxidation-reduction potential. However, the lower limit potential is preferably −0.5 V (vs. RHE) or more because, when the lower limit potential is less than −0.5 V (vs. RHE), hydrogen is drastically generated from the solution.

On the other hand, the upper limit of the potential range (hereinafter may be referred to as upper limit potential) is preferably higher than 1.0 V (vs. RHE), more preferably 1.1 V (vs. RHE) or more, and still more preferably 1.2 V (vs. RHE) or more. Especially in this step, it is preferable that the potential is swept in a range including at least 1.2 V (vs. RHE). Also, the upper limit potential is preferably 2 V (vs. RHE) or less because, when the upper limit potential is more than 2 V (vs. RHE), much palladium may be dissolved.

As just described, by increasing the upper limit potential higher than 1.0 V, the remodification of the palladium atoms on the fine palladium-containing particle surface is promoted and, as a result, the proportion of the Pd{111} surface in the surface can be increased higher than that before the potential applying step.

In this step, from the viewpoint of quick oxide removal, it is preferable to sweep the potential back and forth several times in a predetermined potential range. Examples of the signal pattern of the applied potential include a square wave, a triangle wave and a trapezoidal wave. The signal pattern of the applied potential is not particularly limited, since repeating a low potential and a high potential is important.

In the case where the signal pattern of the applied potential is a square wave, the number of potential cycles is not particularly limited. Holding 0.05 V (vs. RHE) for 15 to 60 seconds and then holding the above-mentioned upper limit potential for 15 to 60 seconds are considered as one cycle, and it is preferable to carry out 1,000 to 3,000 cycles.

In the case where the signal pattern of the applied potential is a triangle wave, the number of the potential cycles is not particularly limited. It is preferably 100 cycles or more, and more preferably 800 to 3,000 cycles. The potential sweep rate can be 5 to 100 mV/sec, for example.

In the potential applying step, the temperature inside a reaction system is not particularly limited. In the case where the potential applying step, the copper covering step and the platinum covering step are carried out in the same reaction container, from the viewpoint of quickly adjusting the temperature inside the reaction system in the platinum covering step to −3° C. or more and 10° C. or less, it is preferable to keep the temperature at −3° C. or more and 10° C. or less. In the present invention, "inside the reaction system" is a concept that encompasses regions used for reactions (such as reaction container and device) and gasses, liquids and solids stored in the regions.

The method for applying the potential to the fine palladium-containing particles and the potential control device can be the same as those used in the below-described copper covering step.

The method for applying the potential to the fine palladium-containing particles in the first dispersion is not particularly limited, and it can be a general method. For example, it may be a method of immersing the working electrode, the counter electrode and the reference electrode in the first dispersion and then applying the potential to the working electrode.

As the working electrode, for example, a material that can ensure electroconductivity can be used, such as metal materials including titanium, a platinum mesh, a platinum plate and a gold plate, and electroconductive carbonaceous materials including glassy carbon and a carbon plate. Also, the reaction container can be formed with the electroconductive material and used as the working electrode. In the case where the reaction container made of a metal material is used as the working electrode, it is preferable that the inner wall of the reaction container is coated with $RuO_2$, from the viewpoint of preventing corrosion. In the case where the reaction container made of a carbonaceous material is used as the working electrode, the container can be used as it is without any coating.

As the counter electrode, for example, a platinum black-plated platinum mesh or electroconductive carbon fibers can be used.

As the reference electrode, for example, a reversible hydrogen electrode (RHE), a silver-silver chloride electrode or a silver-silver chloride-potassium chloride electrode can be used.

As the potential control device, for example, a potentiostat or a potentio-galvanostat can be used.

Figure 3:
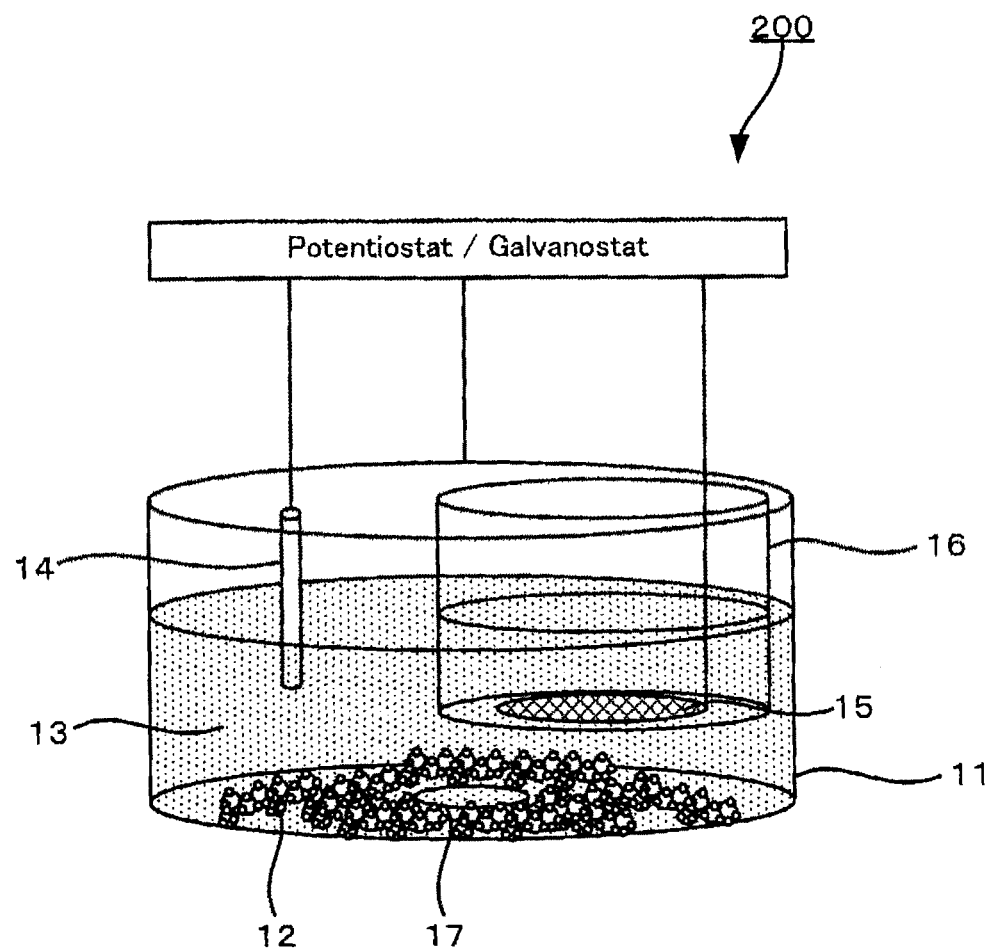
FIG. 3 is a schematic perspective view of an example of an electrochemical device used to carry out the potential applying step.

FIG. 3 is a schematic perspective view of an example of the electrochemical device used to carry out the potential applying step.

An electrochemical device 200 shown in FIG. 3 includes a reaction container 11, a reference electrode 14, a counter electrode 15, a compartment 16 for counter electrode, and a stirrer bar 17.

The reaction container 11 is made of graphite and also functions as a working electrode. An acid solution 13 is contained in the reaction container 11, the solution containing a palladium-supported carbon 12 (hereinafter may be referred to as Pd/C) in which palladium particles are supported on a carbon support. In the reaction container 11, the acid solution 13 containing the Pd/C 12 can be stirred with the stirrer bar 17.

The reference electrode 14 and the counter electrode 15 are placed so that they are fully immersed in the acid solution 13. The reaction container 11, which functions as a working electrode, the reference electrode 14 and the counter electrode 15 are electrically connected to the potentiostat/galvanostat so as to be able to control the potential of the working electrode. To prevent the Pd/C 12 in the acid solution 13 from contact with the counter electrode 15, the counter electrode 15 is immersed in the acid solution 13 in the state of being stored in the compartment 16 for counter electrode, the compartment being made of glass. The bottom of the compartment 16 for counter electrode is made of a porous fritted glass to ensure contact between the counter electrode 15 and the acid solution 13.

First, with dispersing the Pd/C 12 by stirring the acid solution 13 with the stirrer bar 17, from a nitrogen supply source (not shown) placed outside the reaction container, nitrogen is bubbled into the acid solution 13 for a certain amount of time to saturate the acid solution 13 with nitrogen.

Then, from a hydrogen supply source (not shown) placed outside the reaction container, hydrogen is bubbled into the acid solution 13 for a certain amount of time to saturate the acid solution 13 with hydrogen.

Then, from the nitrogen supply source, nitrogen is bubbled into the acid solution 13 again for a certain amount of time to saturate the acid solution 13 with nitrogen.

Then, the potential of the reaction container 11 (working electrode) is swept by the potentiostat/galvanostat to apply a certain potential to the Pd/C 12 brought into contact with the surface of the reaction container 11, thereby removing oxides on the surface of the palladium particles. An example of the conditions of the potential applying step is shown below.

Electrolyte: 0.05 mol/L $H_2SO_4$aq (subjected to inert gas bubbling)
Atmosphere: Under inert gas atmosphere
Sweep rate: 50 mV/sec
Potential sweep range: −0.05 V to 1.2 V (vs. RHE)
Reference electrode: Reversible hydrogen electrode (RHE)

By this step, impurities on the fine palladium-containing particle surface are removed, and the Pd{111} surface is sufficiently grown. Therefore, in the subsequent copper covering step, a larger amount of copper than ever before adsorbs onto the fine palladium-containing particle surface and, in the subsequent platinum covering step, a Pt{111} surface with high catalytic activity is more widely formed on the fine catalyst particle surface. As a result, the catalytic activity of the fine catalyst particles can be increased.

(2) Copper Covering Step

The copper covering step is a step of covering at least part of the fine palladium-containing particle with copper by preparing a second dispersion by mixing the first dispersion and a copper-containing solution after the potential applying step, and applying a potential that is nobler than the oxidation-reduction potential of copper to the fine palladium-containing particles in the second dispersion.

The copper-containing solution is not particularly limited, as long as it is a solution in which copper can be deposited on the surface of the fine palladium-containing particles by Cu-UPD. In the copper-containing solution, the copper may be present in the form of ions or a copper compound such as a copper complex. The copper-containing solution is generally composed of a solvent in which a predetermined amount of copper salt is dissolved. However, it is not limited to this constitution and may be a solution in which copper or a part or all of ions thereof are separately present.

As the solvent used for the copper-containing solution, examples include water and organic solvents. Water is preferred from the point of view that it does not prevent the deposition of copper on the surface of the fine palladium-containing particles.

As the copper salt used for the copper-containing solution, examples include copper sulfate, copper nitrate, copper chloride, copper chlorite, copper perchlorate and copper oxalate.

The copper concentration of the copper-containing solution is not particularly limited and is preferably 10 to 1000 mM.

In addition to the solvent and the copper salt, the copper-containing solution can contain an acid, for example. As the acid that can be added to the copper-containing solution, examples include sulfuric acid, nitric acid, hydrochloric acid, chlorous acid, perchloric acid and oxalic acid. Counter anions in the copper-containing solution and counter anions in the acid can be the same kind or different kinds of counter anions.

It is also preferable to bubble an inert gas into the copper-containing solution in advance. This is because the fine palladium-containing particles can be inhibited from oxidation and can be uniformly covered with the platinum-containing outermost layer. As the inert gas, nitrogen gas, argon gas or the like can be used.

In this step, the second dispersion is prepared by mixing the first dispersion after the potential applying step and the copper-containing solution.

The method for applying the potential to the fine palladium-containing particles in the second dispersion, is not particularly limited and may be a general method. Examples include the following method: the second dispersion is prepared by adding the copper-containing solution in the reaction container 11 of the electrochemical device 200 shown in FIG. 3, with stirring the acid solution 13 by the stirrer bar 17; thereafter, by applying the potential to the reaction container 11, copper is deposited on the surface of the palladium particles of the Pd/C 12 brought into contact with the surface of the reaction container 11.

The applied potential is not particularly limited, as long as it is a potential that can deposit copper on the surface of the fine palladium-containing particles, that is, a nobler potential than the oxidation-reduction potential of copper. For example, the applied potential is preferably in a range of 0.35 to 0.7 V (vs. RHE) and particularly preferably 0.4 V (vs. RHE).

The potential applying time is not particularly limited. It is preferable to apply the potential for 60 minutes or more, and it is more preferable to apply the potential until reaction current becomes steady and close to zero.

The potential can be applied by a potential sweep in a range that includes the above potential range. More specifically, the potential sweep range is preferably 0.3 to 0.8 V (vs. RHE).

The number of the potential sweep cycles is not particularly limited and is preferably 1 to 10,000 cycles. The potential sweep rate is 0.01 to 100 mV/sec, for example.

From the viewpoint of preventing the oxidation of the surface of the fine palladium-containing particles and preventing the oxidation of the copper, it is preferable to carry out the copper covering step under an inert gas atmosphere such as nitrogen atmosphere.

Also in the copper covering step, it is preferable to appropriately stir the second dispersion, as needed. For example, in the case where, like the device shown in FIG. 3, the reaction container that functions as the working electrode is used and the fine palladium-containing particles are dispersed in the second dispersion in the reaction container, the fine palladium-containing particles can be brought into contact with the surface of the reaction container (working electrode) by stirring the second dispersion, and thus a uniform potential can be applied to the fine palladium-containing particles. In this case, the stirring can be carried out continuously or intermittently in the copper covering step.

In the copper covering step, the temperature inside the reaction system is not particularly limited. In the case where the copper covering step and the below-described platinum covering step are carried out in the same reaction container, from the viewpoint of quickly adjusting the temperature inside the reaction system in the platinum covering step to $-3°$ C. or more and $10°$ C. or less, it is preferable to keep the temperature at $-3°$ C. or more and $10°$ C. or less.

(3) Platinum Covering Step

The platinum covering step is a step of covering at least part of the fine palladium-containing particle with platinum by substituting the copper covering at least part of the fine palladium-containing particle with platinum by mixing the second dispersion and a platinum-containing solution after the copper covering step.

In the platinum covering step, the temperature inside the reaction system is preferably kept at $-3°$ C. or more and $10°$ C. or less. From the viewpoint of forming a uniform shell on the surface of the fine palladium-containing particles, the temperature is more preferably kept at $3°$ C. or more and $9°$ C. or less, particularly preferably $5°$ C. or more and $8°$ C. or less. In the case where the temperature is less than $-3°$ C., the solution is frozen and no reaction may proceed. In the case where the temperature is more than $10°$ C., sufficient platinum mass activity may not be obtained.

The method for keeping the temperature inside the reaction system is not particularly limited. For example, it may be a method that uses a circulation cooling device (chiller), a cooling tube, or the like.

The platinum-containing solution is not particularly limited, as long as it contains at least platinum ions and a reaction inhibitor. In the platinum-containing solution, the platinum may be in the form of ions or a platinum compound such as a platinum complex.

The reaction inhibitor is not particularly limited, as long as it can inhibit a substitution reaction between the copper and the platinum. As the reaction inhibitor, examples include a complex forming agent that forms a complex with the platinum, the copper deposited on the fine palladium-containing particle surface, and the palladium exposed on the fine palladium-containing particle surface, in the solution.

As the complex forming agent, examples include citric acid, sodium salt of citric acid, potassium salt of citric acid, ethylenediaminetetraacetic acid (hereinafter may be referred to as EDTA), sodium salt of EDTA, and potassium salt of EDTA. Preferred is citric acid. These complex forming agents can be used alone or in combination of two or more kinds. In the solution, these complex forming agents form a complex with the platinum and the copper; therefore, the substitution reaction between the copper and the platinum is inhibited and, as a result, the fine palladium-containing particle surface can be uniformly covered with the platinum-containing shell.

The concentration of the reaction inhibitor in the platinum-containing solution is not particularly limited and is preferably 1 to 10 times higher than the platinum ion concentration.

A platinum salt is used for the platinum-containing solution. Examples of the platinum salt include $K_2PtCl_4$ and $K_2PtCl_6$. Also, an ammonia complex such as ([PtCl$_4$][Pt(NH$_3$)$_4$]) can be used.

The platinum ion concentration of the platinum-containing solution is not particularly limited and is preferably 0.01 to 100 mM.

A solvent is used for the platinum-containing solution. The solvent can be the same as the solvent used for the copper-containing solution described above.

In addition to the solvent, the reaction inhibitor and the platinum salt, the platinum-containing solution can also contain an acid, etc. The acid can be the same as the acid used for the copper-containing solution described above.

From the viewpoint of keeping the temperature inside the reaction system at −3° C. or more and 10° C. or less, it is preferable to adjust the temperature of the platinum-containing solution to −3° C. or more and 10° C. or less in advance. Also, the platinum-containing solution is sufficiently stirred, and from the viewpoint of preventing the oxidation of the surface of the fine palladium-containing particles or preventing the oxidation of the copper, it is preferable to bubble nitrogen into the solution in advance.

The substitution time (contact time between the platinum-containing solution and the fine palladium-containing particles) is not particularly limited and is preferably 10 minutes or more. Since the potential of the reaction solution is increased by adding the platinum-containing solution, it is more preferable to continue the substitution until the potential monitored shows no change.

The method for bringing the copper deposited on the surface of the fine palladium-containing particles into contact with the platinum-containing solution is not particularly limited. In the case where the copper covering step and the platinum covering step are carried out in the same reaction container, the platinum-containing solution can be added to the copper-containing solution used in the copper covering step. For example, in the case of using the electrochemical device 200 shown in FIG. 3, it is allowed that after the copper covering step, the potential control in the reaction container 11 is stopped, and the platinum-containing solution is gradually added in the reaction container 11, with stirring the acid solution 13 with the stirrer bar 17, thereby bringing the fine palladium-containing particles on which copper is deposited into contact with the platinum-containing solution.

It is preferable that the platinum-containing outermost layer formed by this step has high catalytic activity. As used herein, "catalytic activity" refers to the activity which is required of a fuel cell catalyst, especially oxygen reduction reaction (ORR) activity.

The platinum-containing outermost layer can contain platinum only, or it can also contain iridium, ruthenium, rhodium or gold, in addition to platinum. In the case of using a platinum alloy for the platinum-containing outermost layer, the platinum alloy can contain platinum and only one kind of metal, or it can contain platinum and two or more kinds of metals.

In the above-described potential applying step, the Pd{111} surface grows sufficiently larger than the Pd{110} surface and the Pd{100} surface. Since a Pt{111} crystal is likely to grow on the Pd{111} surface, the proportion of the Pt{111} surface is the largest on the fine catalyst particle surface subjected to the platinum covering step. The catalytic activity of the thus-obtained fine catalyst particles can be increased by increasing the proportion of the area of the Pt{111} surface larger than ever before, the surface having high catalytic activity.

(4) Washing Step

The washing step is a step of washing, with water, the fine palladium-containing particles subjected to the substitution of the copper with the platinum, after the platinum covering step. From the viewpoint of eluting the reaction inhibitor physically adsorbing to the support surface, the washing step is preferably carried out before the acid treatment step.

In the washing step, the water can be cold water or warm water. Or, cold water and warm water can be used in combination for washing. More specifically, the fine palladium-containing particles can be washed with cold water at less than 30° C. and then washed with warm water.

The temperature of the warm water is preferably 30° C. or more and 100° C. or less, from the viewpoint of eluting the reaction inhibitor physically adsorbing to the support surface.

The washing step is preferably a step of washing the fine palladium-containing particles by dispersing them in water, preferably in warm water. The method for dispersing the fine palladium-containing particles in water is not particularly limited. For example, it may be a dispersion method with ultrasonic waves, a method of pulverizing the particles with a ball mill and then adding them to water, or a method for dispersing the particles with a device that uses shear force, such as a nanomizer. Of them, the dispersion method with ultrasonic waves is preferably used, from the viewpoint of relatively less damage to the structure of the fine palladium-containing particles.

It is preferable to repeat the washing step until the conductivity of the water used for washing (hereinafter may be referred to as washing water) reaches 10 μS/cm or less. This is because the amount of the reaction inhibitor physically adsorbing to the support surface is determined to be still large when the conductivity of the washing water is high. In particular, the washing water refers to supernatant water obtained by adding the fine palladium-containing particles to water (10 g per liter of water) in a container and dispersing them.

(5) Acid Treatment Step

The acid treatment step is a step of bringing an acid solution into contact with the fine palladium-containing particles subjected to the substitution of the copper with the platinum, after the platinum covering step. By the acid treatment, the fine palladium-containing particles exposed are selectively eluted, so that the fine palladium-containing particles become smaller. Therefore, the defective sites of the platinum-containing outermost layer are mended, so that the platinum mass activity of the fine catalyst particles can be increased.

As the acid solution, examples include nitric acid, sulfuric acid, perchloric acid, hydrochloric acid and hypochlorous acid. Of them, nitric acid is preferred because it is highly acidic.

The concentration of the acid solution is as follows: for example, in the case of using nitric acid as the acid solution, the nitric acid concentration is preferably $1.0 \times 10^{-4}$ to 2 mol/L, more preferably $1.0 \times 10^{-3}$ to 1 mol/L, and still more preferably $1.0 \times 10^{-2}$ to $1.0 \times 10^{-1}$ mol/L.

In the case of using sulfuric acid as the acid solution, the sulfuric acid concentration is preferably $1.0 \times 10^{-4}$ to 2 mol/L, more preferably $1.0 \times 10^{-3}$ to 1 mol/L, and still more preferably $1.0 \times 10^{-2}$ to $1.0 \times 10^{-1}$ mol/L.

The temperature of the acid solution is preferably 40° C. or more, particularly preferably 50° C. or more, since the defective sites of the platinum-containing outermost layer can be effectively and efficiently mended. Also, the temperature of the acid solution is preferably 90° C. or less, particularly preferably 80° C. or less, from the viewpoint of preventing the fine palladium-containing particles from aggregation, etc.

The time to bring the fine palladium-containing particles into contact with the acid solution can be appropriately adjusted, depending on the type, concentration, temperature, etc., of the acid solution. For example, it can be about 30 minutes to 2 hours.

The method for bringing the fine palladium-containing particles into contact with the acid solution is not particularly limited. From the viewpoint of allowing the acid treatment to sufficiently proceed, a method for immersing the fine palladium-containing particles in the acid solution is preferred. At the time of immersing the fine palladium-containing particles in the acid solution, it is preferable to stir the acid solution and disperse the particles with a ultrasonic homogenizer, a magnetic stirrer, a motor with stirring blades, etc.

(6) Drying Step

The drying step is a step of drying the fine catalyst particles obtained after the platinum covering step.

The method for drying the fine catalyst particles is not particularly limited, as long as it is a method that can remove the solvent, etc. For example, it may be such a drying method that a temperature of 50 to 100° C. is kept for 6 to 12 hours under an inert gas atmosphere.

As needed, the fine catalyst particles can be pulverized. The pulverizing method is not particularly limited, as long as it is a method that can pulverize solids. Examples of the pulverization include pulverization using a mortar or the like under an inert gas atmosphere or in the atmosphere, and mechanical milling such as a ball mill, turbo mill or the like.

The fine catalyst particles obtained by the present invention is preferably for use in fuel cells. From the viewpoint of excellent oxygen reduction activity, the fine catalyst particles obtained by the present invention is preferably used in electrodes for fuel cells, more preferably in cathode electrodes for fuel cells.

From the point of view that the elution of the fine palladium-containing particles can be more inhibited, the coverage of the fine palladium-containing particle with the platinum-containing outermost layer is generally 0.5 to 2, preferably 0.8 to 1. When the coverage of the fine palladium-containing particle with the platinum-containing outermost layer is less than 0.5, the palladium-containing particles are eluted in an electrochemical reaction and, as a result, the fine catalyst particles may deteriorate.

As used herein, "coverage of the fine palladium-containing particle with the platinum-containing outermost layer" means the proportion of the area of the fine palladium-containing particle covered with the platinum-containing outermost layer, on the assumption that the total surface area of the fine palladium-containing particle is 1. An example of the method for calculating the coverage is as follows. First, an outermost layer metal content (A) in the fine catalyst particle is measured by inductively coupled plasma mass spectrometry (ICP-MS), etc. Meanwhile, the average particle diameter of the fine catalyst particles is measured with a transmission electron microscope (TEM), etc. From the average particle diameter thus measured, the number of atoms on the surface of a particle having the same diameter is estimated, and an outermost layer metal content (B) in the case where one atomic layer on the particle surface is substituted with the metal contained in the platinum-containing outermost layer, is estimated. The value obtained by dividing the outermost layer metal content (A) by the outermost layer metal content (B) is the "coverage of the fine palladium-containing particle with the platinum-containing outermost layer".

The platinum-containing outermost layer covering the fine palladium-containing particle is preferably a monoatomic layer. The fine catalyst particle having such a structure is advantageous in that, compared to a fine catalyst particle having a platinum-containing outermost layer that is composed of two or more atomic layers, the catalytic performance of the platinum-containing outermost layer is much higher and, since the amount of the platinum-containing outermost layer covering the fine palladium-containing particle is small, the material cost is lower.

The average particle diameter of the fine catalyst particles is preferably 3.0 nm or more, and more preferably 3.5 nm or more. The average particle diameter of the fine catalyst particles is preferably 6.0 nm or less, and more preferably 5.5 nm or less.

EXAMPLES

Hereinafter, the present invention will be explained in more detail, by way of Examples and Comparative Examples. The scope of the present invention is not limited to these Examples and Comparative Examples.

1. Production of Carbon-Supported Catalyst

Example 1

1-1. Preparation of First Dispersion

OSAB (product name; manufactured by: Denki Kagaku Kogyo Kabushiki Kaisha) was used as a carbon support. The carbon support was dispersed in nitric acid. Chloropalladous acid was added to the resulting dispersion mixture. With heating at a temperature condition of 100° C. or less, sodium borohydride ($NaBH_4$) was added to the mixture to reduce palladium. After the reaction was completed, the resulting reaction mixture was filtered. A solid thus obtained was washed and then dried for 24 hours under an inert atmosphere, thereby producing a carbon-supported palladium. The average particle diameter of fine palladium particles in the carbon-supported palladium was 5.2 nm. Then, 5 g of the carbon-supported palladium thus produced was added to 1 L of pure water and dispersed therein with a ultrasonic homogenizer, thereby preparing the first dispersion.

Figure 4:
FIG. 4 is a TEM image of carbon-supported palladium used in Example 1.

FIG. 4 is a TEM image of carbon-supported palladium used in Example 1. In the TEM image, white dots are fine palladium particles, and a light white blurring area is a carbon support. For 500 or more fine palladium particles shown in this TEM image, their equivalent circle particle diameters were calculated to form a histogram of particle size distribution.

Figure 5:
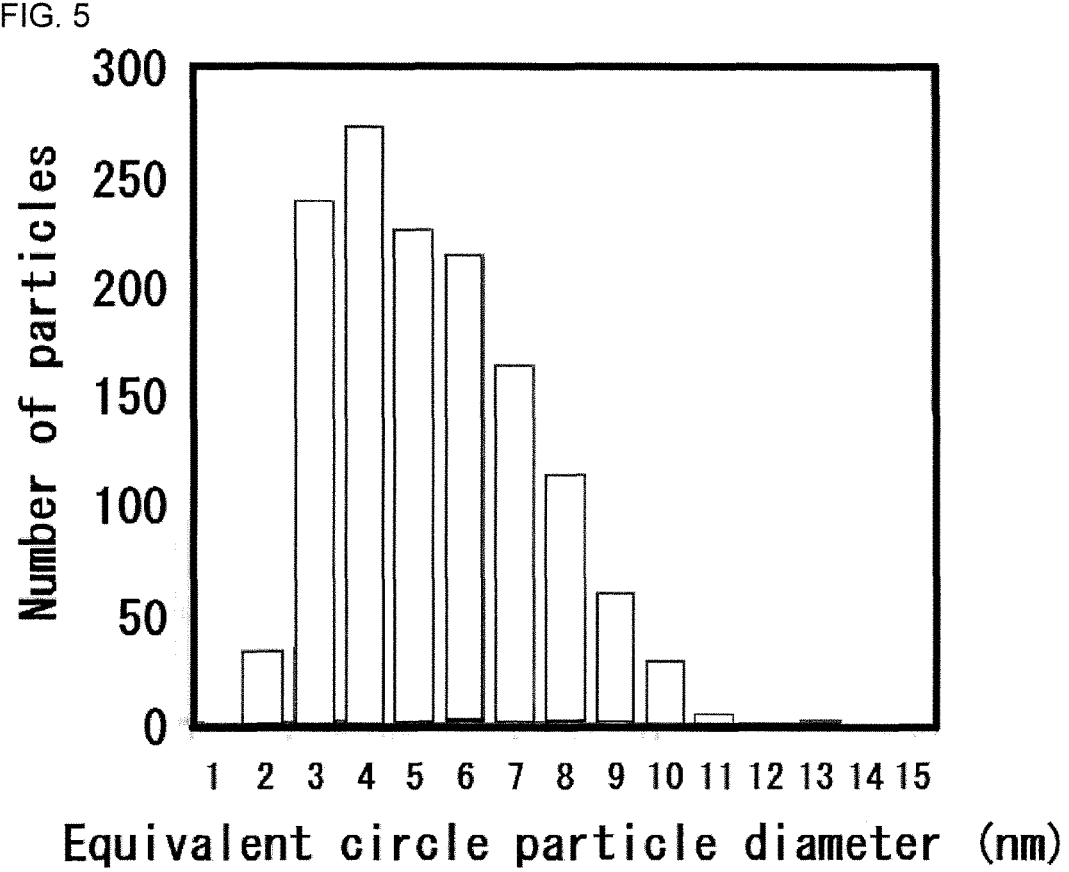
FIG. 5 is a histogram showing the particle size distribution of fine palladium particles in the carbon-supported palladium used in Example 1.

FIG. 5 is a histogram showing the particle size distribution of fine palladium particles in the carbon-supported palladium used in Example 1. As shown in the histogram, the most frequent equivalent circle particle diameter of the fine palladium particles is 4 nm. As described above, the average particle diameter is 5.2 nm.

1-2. Potential Applying Step

The first dispersion thus obtained was put in the reaction container (reaction container 11) of an electrochemical device (electrochemical device 200) shown in FIG. 3. Sulfuric acid was added thereto so as to reach the sulfuric acid concentration of 0.05 mol/L. The electrochemical device 200 was moved to the inside of a glove box. An inert gas ($N_2$ gas) was sufficiently bubbled into the first dispersion for deoxidization. A triangle wave of potential was applied to the working electrode (reaction container 11) of the electrochemical device 200, in a potential range of 0.05 to 1.2 V (vs. RHE) for 2,500 cycles, thereby sufficiently cleaning the fine palladium particle surface and the carbon support surface.

Figure 6:
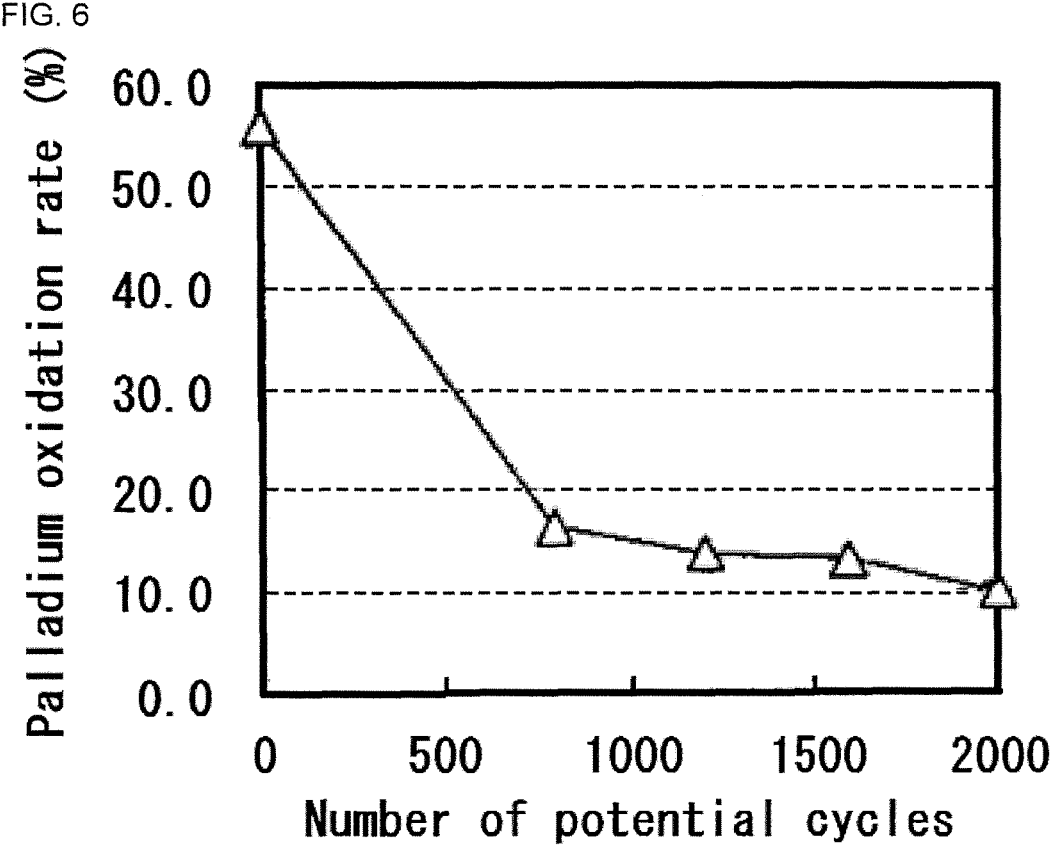
FIG. 6 is a graph in which the palladium oxidation rates of samples collected in the course of the preparation of the carbon-supported palladium, are plotted.

FIG. 6 is a graph in which the palladium oxidation rates of samples collected in the course of the preparation of the carbon-supported palladium used in Example 1, are plotted. More specifically, it is a graph in which the palladium oxidation rate of a sample not subjected to the potential applying step (the number of cycles is 0), the palladium oxidation rate of a sample at the 800th cycle (the number of cycles is 800), the palladium oxidation rate of a sample at the 1,200th cycle (the number of cycles is 1,200), the palladium oxidation rate of a sample at the 1,600th cycle (the number of cycles is 1,600) and the palladium oxidation rate of a sample at the 2,000 cycles (the number of cycles is 2,000) are plotted. The palladium oxidation rate measuring and calculating methods are as follows.

The carbon-supported palladium samples were subjected to CV cleaning and then analyzed by X-ray photoelectron spectroscopy to quantitate the amount of oxygen present in the carbon-supported palladium samples. The palladium oxidation rate was calculated on the assumption that the observed oxygen is present only on the palladium surface.

Device: Multifunctional scanning X-ray photoelectron spectrometer (product name: Versa Probe II; manufactured by: ULVAC-PHI, Inc.)

Measurement conditions:
X-ray source: AlKα (monochrome, 25 W)
Analysis region: 1.0×0.5 mm$^2$ (scanned with 0.1 mmφ probe)
Note: A charge neutralization mechanism (electron beam and ion beam) was used.

As is clear from FIG. 6, for the sample with a cycle number of 0, the palladium oxidation rate is more than 55%. From this, it is clear that more than half the palladium surface not subjected to the potential treatment, is covered with palladium oxide. As the cycle number increased, the palladium oxidation rate gradually decreased. For the sample with a cycle number of 2,000, the palladium oxidation rate decreased to 10%.

From the above result, it is clear that by carrying out the potential applying step, palladium oxide is removed from most of the palladium surface of the carbon-supported palladium.

Figure 7:
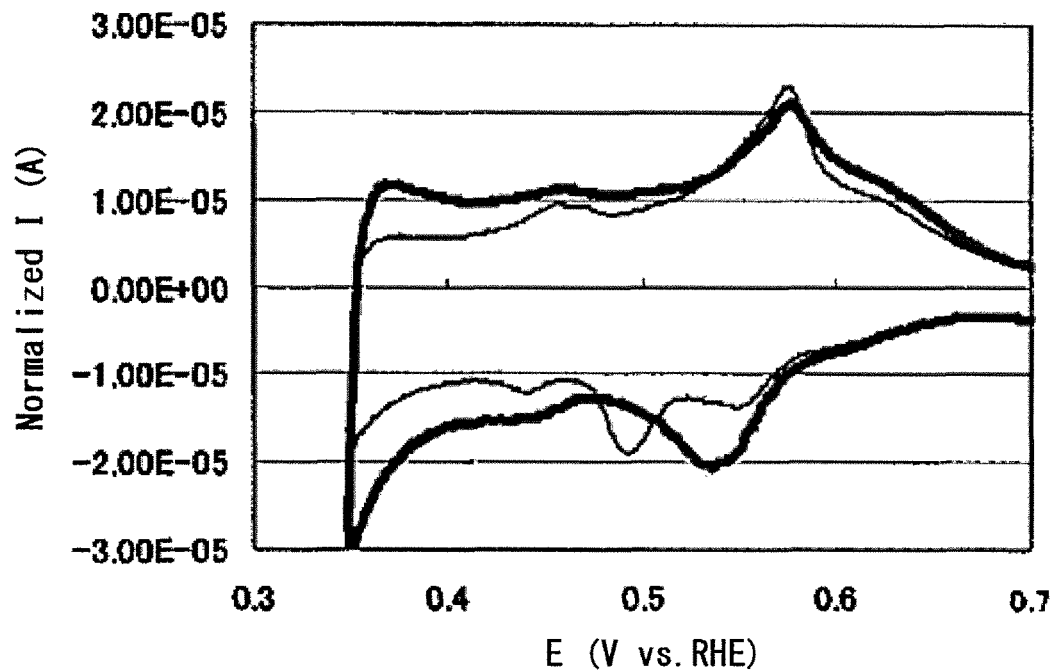
FIG. 7 is a graph showing the cyclic voltammogram (thin curve) of fine palladium particles before subjected to the potential applying step in Example 1 and the cyclic voltammogram (thick curve) of the fine palladium particles at the 2,500th cycle in Example 1, the cyclic voltammograms overlapping with each other.

FIG. 7 is a graph showing the cyclic voltammogram (thin curve) of fine palladium particles before subjected to the potential applying step in Example 1 and the cyclic voltammogram (thick curve) of the fine palladium particles at the 2,500th cycle in Example 1, the cyclic voltammograms overlapping with each other. Cyclic voltammetry was carried out by the electrochemical device shown in FIG. 2. The cyclic voltammetry conditions are as follows.

Electrolyte: 0.1 M perchloric acid aqueous solution (subjected to inert gas bubbling)
Atmosphere: Under inert gas atmosphere
Sweep rate: 50 mV/sec
Potential sweep range (potential window): 0.35 to 0.70 V (vs. RHE)
Reference electrode: Reversible hydrogen electrode (RHE)

As is clear from the thin line in FIG. 7, in the initial cyclic voltammogram, the peak indicating the Pd{111} surface, which appears around 0.52 V (vs. RHE), is still small, and the peak indicating Pd{110} or Pd{100}, which appears in a region less than 0.50 V (vs. RHE), is larger. On the other hand, as is clear from the thick line in FIG. 7, in the cyclic voltammogram at the 2,500th cycle, the peak that appeared at 0.50 V (vs. RHE) almost disappeared, and the peak at 0.52 V (vs. RHE) is the largest. The reason for this is considered to be because, as a result of the potential sweep in a wide potential range of 0.05 to 1.2 V (vs. RHE), the growth of the Pd{111} surface, which is a more electrochemically stable surface, was promoted.

1-3. Copper Covering Step (Cu-UPD)

The electrochemical device 200 shown in FIG. 3 was alsoused in this step. With bubbling nitrogen into the first dispersion in the reaction container 11, a copper-containing solution of 14.6 g of copper sulfate pentahydrate dissolved in 66 mL of 0.05 M sulfuric acid, was added in the reaction container 11 to prepare a second dispersion. By fixing the potential of the working electrode (reaction container 11) at 0.4 V (vs. RHE) for two hours, the potential was applied to fine palladium particles in the second dispersion to deposit copper on the fine palladium particles.

1-4. Platinum Covering Step

The potential control at 0.4 V (vs. RHE) was stopped. A platinum-containing solution of 161.3 mg of $K_2PtCl_4$ and 4.5 g of citric acid monohydrate dissolved in 140 mL of 0.05 M sulfuric acid, was added in the reaction container 11 containing the second dispersion for about 80 minutes. Then, the resulting mixture was stirred for one hour to substitute copper with platinum. The platinum atom amount added was 100 atm %, when the minimum platinum atom amount required to cover the fine palladium particles with a platinum monoatomic layer was determined as 100 atm %.

1-5. Post-Treatment

The resulting reaction solution was filtered to collect a carbon-supported catalyst. The carbon-supported catalyst was washed, dried and then pulverized using an agate mortar and a pestle, thereby producing the carbon-supported catalyst of Example 1.

Example 2

The carbon-supported catalyst of Example 2 was produced in the same manner as Example 1, except that in the potential applying step, the upper limit of the range of the applied potential was changed from 1.2 V (vs. RHE) to 1.4 V (vs. RHE).

Example 3

The carbon-supported catalyst of Example 3 was produced in the same manner as Example 1, except that a carbon-supported palladium in which the fine palladium particles have an average particle diameter of 3.8 nm, was produced and used.

Comparative Example 1

The carbon-supported catalyst of Comparative Example 1 was produced in the same manner as Example 1, except that in the potential applying step, the upper limit of the range of the applied potential was changed from 1.2 V (vs. RHE) to 1.0 V (vs. RHE).

Figure 12:
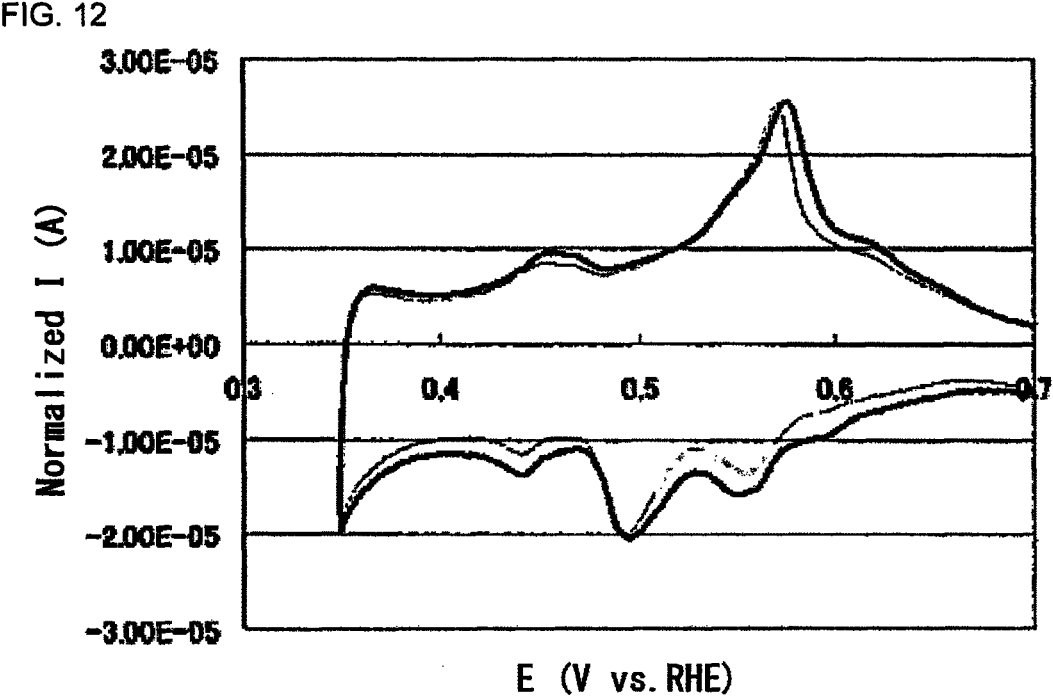
FIG. 12 is a graph showing the cyclic voltammogram (thin curve) of fine palladium particles before subjected to the potential applying step in Comparative Example 1 and the cyclic voltammogram (thick curve) of the fine palladium-containing palladium particles at the 2,500th cycle in Comparative Example 1, the cyclic voltammograms overlapping with each other.

FIG. 12 is a graph showing the cyclic voltammogram (thin curve) of fine palladium particles before subjected to the potential applying step in Comparative Example 1 and thecyclic voltammogram (thick curve) of the fine palladium particles at the 2,500th cycle in Comparative Example 1, the cyclic voltammograms overlapping with each other.

As is clear from the thin and thick curves in FIG. 12, there is no particular difference between the peak appearing in the cyclic voltammogram of the fine palladium particles before the potential applying step and the peak appearing in the cyclic voltammogram of the fine palladium particles at the 2,500th cycle. More specifically, the peak appearing around 0.50 V (vs. RHE) and indicating Pd{110} or Pd{100}, appears the largest in both of the cyclic voltammograms. This indicates the following: as a result of the potential sweep in a relatively narrow range of 0.05 to 1.0 V (vs. RHE), the Pd{111} surface was not completely grown, and the Pd{110} or Pd{100} surface is still the largest crystal surface.

Comparative Example 2

The carbon-supported catalyst of Comparative Example 2 was produced in the same manner as Example 1, except that in the potential applying step, the upper limit of the range of the applied potential was changed from 1.2 V (vs. RHE) to 0.8 V (vs. RHE).

Comparative Example 3

The carbon-supported catalyst of Comparative Example 3 was produced in the same manner as Example 1, except that in the potential applying step, the upper limit of the range of the applied potential was changed from 1.2 V (vs. RHE) to 0.45 V (vs. RHE).

Comparative Example 4

The carbon-supported catalyst of Comparative Example 4 was produced in the same manner as Example 1, except that a carbon-supported palladium in which the fine palladium particles have an average particle diameter of 1.6 nm, was produced and used.

Figure 10:
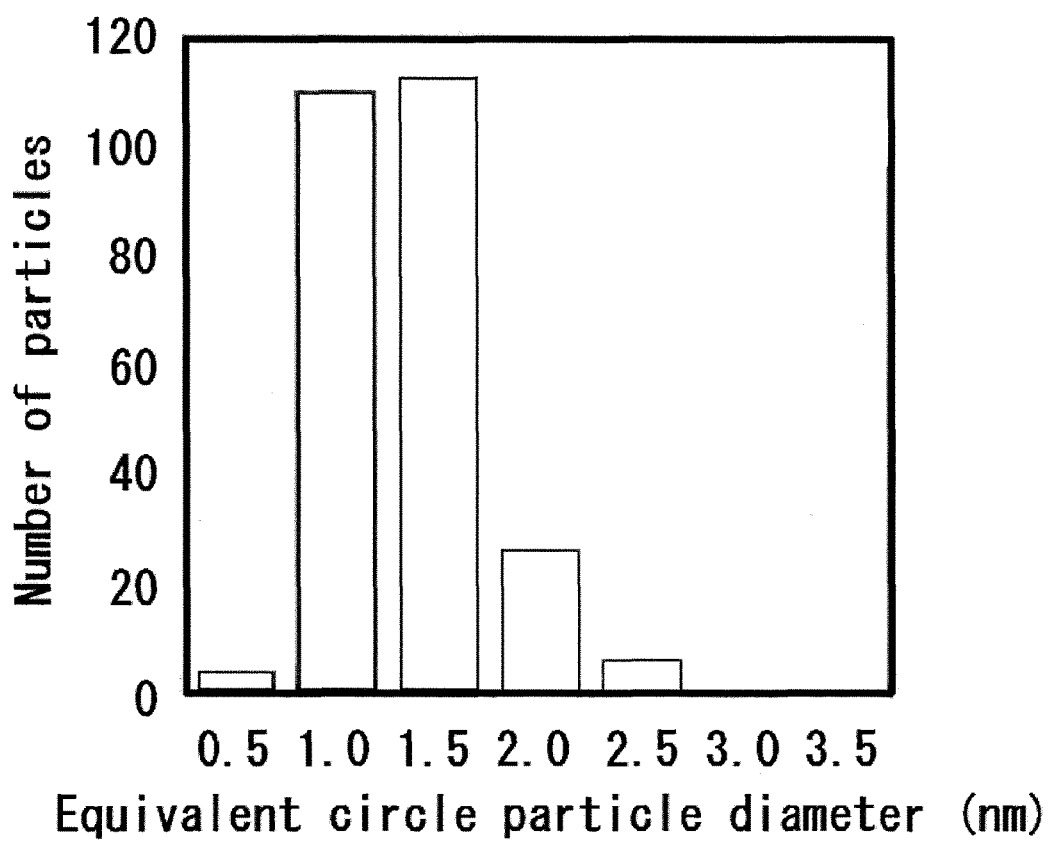
FIG. 10 is a histogram showing the particle size distribution of fine palladium particles in the carbon-supported palladium used in Comparative Example 4.

FIG. 10 is a histogram showing the particle size distribution of the fine palladium particles in the carbon-supported palladium used in Comparative Example 4. As shown in the histogram, the most frequent equivalent circle particle diameter of the fine palladium particles is 1.5 nm. As described above, the average particle diameter is 1.6 nm.

Comparative Example 5

The carbon-supported catalyst of Comparative Example 5 was produced in the same manner as Example 1, except that a carbon-supported palladium in which the fine palladium particles have an average particle diameter of 8.2 nm, was produced and used.

Comparative Example 6

The carbon-supported catalyst of Comparative Example 6 was produced in the same manner as Example 1, except that a carbon-supported palladium in which the fine palladium particles have an average particle diameter of 10.5 nm, was produced and used.

Figure 11:
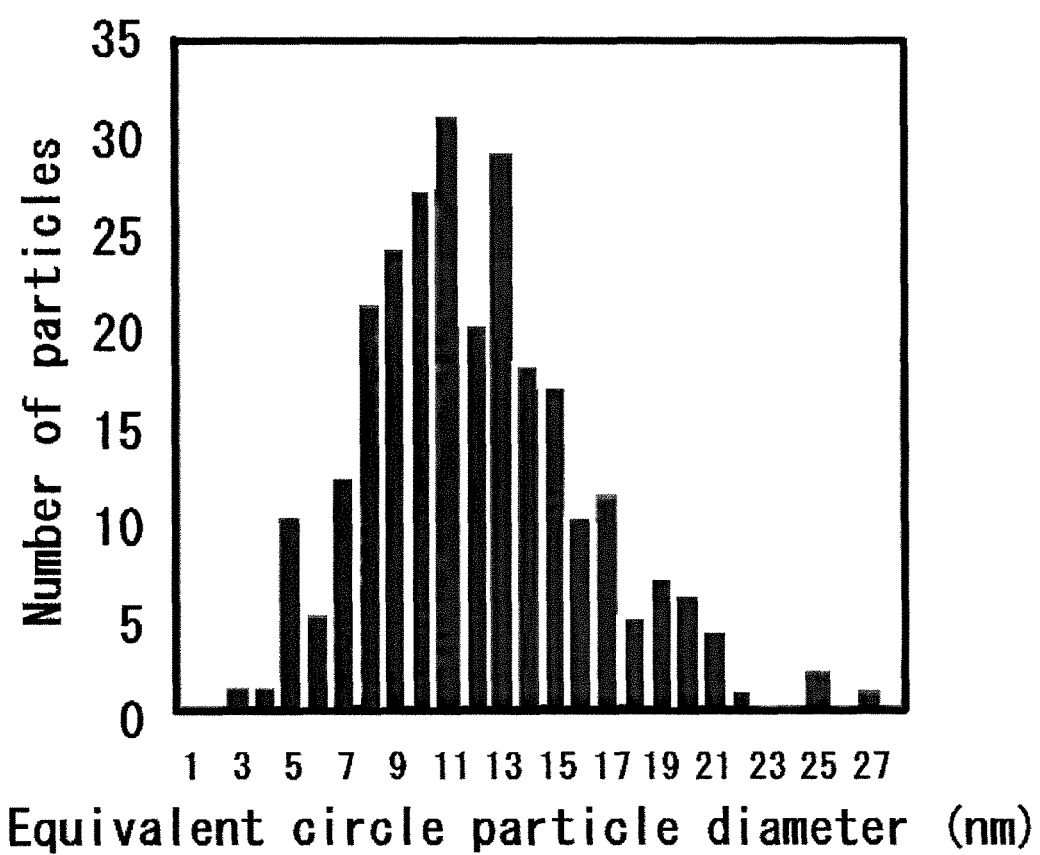
FIG. 11 is a histogram showing the particle size distribution of fine palladium particles in the carbon-supported palladium used in Comparative Example 6.

FIG. 11 is a histogram showing the particle size distribution of the fine palladium particles in the carbon-supported palladium used in Comparative Example 6. As shown in the histogram, the most frequent equivalent circle particle diameter of the fine palladium particles is 11 nm. As described above, the average particle diameter is 10.5 nm.

Comparative Example 7

The carbon-supported catalyst of Comparative Example 7 was produced in the same manner as Example 1, except that the potential applying step was not carried out.

2. Catalytic Activity Evaluation for Carbon-Supported Catalysts

For the carbon-supported catalysts of Examples 1 to 3 and Comparative Examples 1 to 7, the mass activity was obtained by use of an RDE.

(a) RDE Measurement

Each carbon-supported catalyst was dried to obtain a powder, and the powder was pulverized with a mortar. The powder was dispersed in a mixed solution of 6.0 mL of ultrapure water, 1.5 mL of isopropanol and 35 μL of a 5% perfluorocarbon sulfonic acid polymer-based electrolyte dispersion (trade name: Nafion; manufactured by: DuPont). A dispersion thus obtained was applied to the RDE and naturally dried.

The RDE prepared was immersed in a 0.1 M perchloric acid aqueous solution. With rotating the RDE at 1,600 rpm, linear sweep voltammetry (LSV) was carried out. At this time, as the 0.1 M perchloric acid aqueous solution, a 0.1 M perchloric acid aqueous solution preliminarily subjected to oxygen gas bubbling at a gas flow rate of 30 mL/min for 30 minutes or more, was used.

The LSV procedure is as follows. First, a potential sweep was repeatedly carried out in a range from 1.05 V to 0.05 V (vs. RHE) at a rate of 10 mV/sec. The potential sweep was repeated until current values at 0.9 V (vs. RHE) and 0.35 V (vs. RHE) become stable. Then, from the reduction wave of a linear sweep voltammogram thus obtained, the current value at 0.9 V (vs. RHE) was determined as oxygen reduction current value ($I_{0.9}$) and the current value at 0.35 V (vs. RHE) was determined as diffusion limited current value ($I_{lim}$). From these current values, an activation controlled current value (Ik) was obtained, based on the following formula (1).

The catalytic activity per unit mass of the platinum (A/g-Pt) was calculated by dividing the activation controlled current value (Ik) by the amount (g) of the platinum applied onto the RDE.

$Ik = (I_{lim} \times I_{0.9})/(I_{lim} - I_{0.9})$      Formula (1)

(In the formula (1), Ik is activation controlled current value (A); $I_{lim}$ is diffusion limited current value (A); and $I_{0.9}$ is oxygen reduction current value (A).)

(b) Coverage Evaluation by TEM-EDS

On 40 samples subjected to the above "1-2. Potential applying step" and another 40 samples not subjected to the above "1-2. Potential applying step", transmission electron microscope-energy dispersive X-ray spectroscopy (TEM-EDS) was carried out to measure the coverage of the palladium surface with the platinum. Details of the TEM-EDS measurement method are as follows.

TEM: Field emission transmission electron microscope (Cs-corrected) (product name: JEM-2100F; manufactured by: JEOL Ltd.)
    Accelerating voltage: 120 kV
    EDS: UTW Si (Li) semiconductor detector (manufactured by: JEOL Ltd.)
    Beam diameter: 0.2 nm
    Particle analysis: Particle Analysis Ver. 3.5 (product name; manufactured by: Sumitomo Metal Technology, Inc.)

Figure 8:
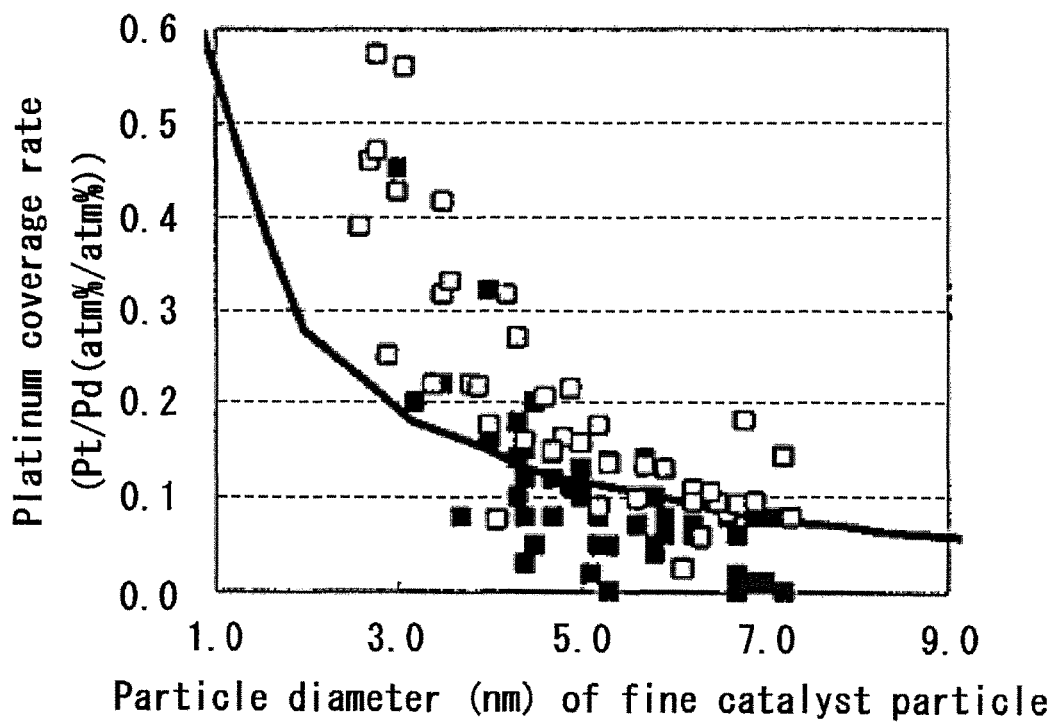
FIG. 8 is a graph showing the relationship between fine catalyst particle diameter and platinum coverage for 40 samples subjected to the potential applying step and 40 samples not subjected to the potential applying step.

FIG. 8 is a graph showing the relationship between fine catalyst particle diameter and platinum coverage for the above-mentioned 80 samples. It is a graph with platinum coverage (Pt/Pd (atm %/atm %)) on the vertical axis and fine catalyst particle diameter (nm) on the horizontal axis. In FIG. 8, the data of the samples subjected to the above "1-2. Potential applying step" are plotted with white squares, and the data of the samples not subjected to the above "1-2. Potential applying step" are plotted with black squares. Also, a thick curve shown in FIG. 8 is a graph showing the theoretical value of platinum coverage with respect to particle diameter, in the most ideal case where all the surface of the fine palladium particle is covered with the platinum monoatomic layer (hereinafter may be referred to as 1 ML curve). The squares plotted above the curve can be evaluated as being sufficiently high in platinum coverage. On the other hand, the squares plotted below the curve can be evaluated as being defective in platinum-containing outermost layer.

As is clear from FIG. 8, while many white squares are plotted and distributed above the 1 ML curve, many black squares are present densely below the 1 ML curve. This result indicates that, regardless of the particle diameter, the platinum coverage can be increased by carrying out the potential applying step on the carbon-supported palladium.

For the carbon-supported catalysts of Examples 1 to 3 and Comparative Examples 1 to 7, the Pd{111} peak evaluation result and the mass activity are shown in the following Table 1, along with the details of the production method.

TABLE 1

| | Conditions of potential applying step | | | |
|---|---|---|---|---|
| | Average particle diameter (nm) of fine palladium particles | Upper limit of potential (V vs. RHE) | Pd{111} peak is larger than Pd {110} peak and Pd{100} peak | Mass activity (A/g-Pt) |
| Example 1 | 5.2 | 1.2 | YES | 960 |
| Example 2 | 5.2 | 1.4 | YES | 870 |
| Example 3 | 3.8 | 1.2 | YES | 950 |
| Comparative Example 1 | 5.2 | 1.0 | NO | 650 |
| Comparative Example 2 | 5.2 | 0.8 | NO | 640 |
| Comparative Example 3 | 5.2 | 0.45 | NO | 450 |
| Comparative Example 4 | 1.6 | 1.2 | NO | 240 |
| Comparative Example 5 | 8.2 | 1.2 | NO | 540 |
| Comparative Example 6 | 10.5 | 1.2 | NO | 420 |
| Comparative Example 7 | — | — | — | 400 |

3. Catalyst Evaluation

As shown in Table 1, in the potential applying step in Comparative Examples 1 to 3, the upper limit of the potential was set to 1.0 V (vs. RHE), 0.8 V (vs. RHE) or 0.45 V (vs. RHE). For the fine palladium particles subjected to the potential applying step in Comparative Examples 1 to 3, the peak indicating the Pd{111} surface in the reduction wave of the cyclic voltammogram could not be larger than the peak indicating the Pd{110} surface and the peak indicating the Pd{100} surface.

The mass activity of Comparative Examples 1 to 3 is 650 (A/g-Pt), 640 (A/g-Pt) or 450 (A/g-Pt). This is less than 70% of the mass activity of Example 1 in which the fine palladium particles with the same average particle diameter were used.

The reason for such small mass activities of Comparative Examples 1 to 3 is considered as follows: the Pd{111} surface did not appear enough on the fine palladium particle surface and, as a result, the proportion of the Pt{111} surface with high catalytic activity in the fine catalyst particle surface obtained through the platinum covering step, was small.

As shown in Table 1, in Comparative Example 4, as a result of using the fine palladium particles having an average particle diameter of 1.6 nm, the peak indicating the Pd{111} surface in the reduction wave of the cyclic voltammogram could not be larger than the peak indicating the Pd{110} surface and the peak indicating the Pd{100} surface, in the potential applying step.

The mass activity of Comparative Example 4 is 240 (A/g-Pt). This is the lowest mass activity among the experimental results shown in Table 1.

The reason for such a low mass activity of Comparative Example 4 in which the fine palladium particles having an average particle diameter of less than 3.0 nm were used, is considered as follows: since the proportion of low-coordinated palladium atoms (palladium atoms located at edges and corners) on the fine palladium particle surface is high, the low-coordinated palladium atoms were eluted in the potential applying step and, as a result, palladium was deposited on the fine catalyst particle surface obtained through the platinum covering step; therefore, the Pt{111} surface with high catalytic activity could not be large.

As shown in Table 1, in Comparative Examples 5 and 6, as a result of using the fine palladium particles having an average particle diameter of 8.2 nm or 10.5 nm, the peak indicating the Pd{111} surface in the reduction wave of the cyclic voltammogram could not be larger than the peak indicating the Pd{110} surface and the peak indicating the Pd{100} surface, in the potential applying step.

The mass activity of Comparative Examples 5 and 6 is 540 (A/g-Pt) or 420 (A/g-Pt). This is less than 60% of the mass activity of Example 1 in which the same potential range was employed in the potential applying step.

The reason for such small mass activities in Comparative Examples 5 and 6 in which the fine palladium particles having an average particle diameter of more than 6.0 nm were used, is considered as follows: since the surface energy of the fine palladium particles is small and the palladium itself is stable, the rearrangement of the palladium atoms on the fine particle surface was not promoted even after the potential applying step, and the Pd{111} surface did not grow sufficiently; therefore, the proportion of the Pt{111} surface with high catalytic activity in the fine catalyst particle surface obtained through the platinum covering step, was small.

As shown in Table 1, in Comparative Example 7 in which the potential applying step was not carried out, the mass activity is 400 (A/g-Pt). This is about 40% of the mass activity of Example 1 in which the potential applying step was carried out.

Figure 9:
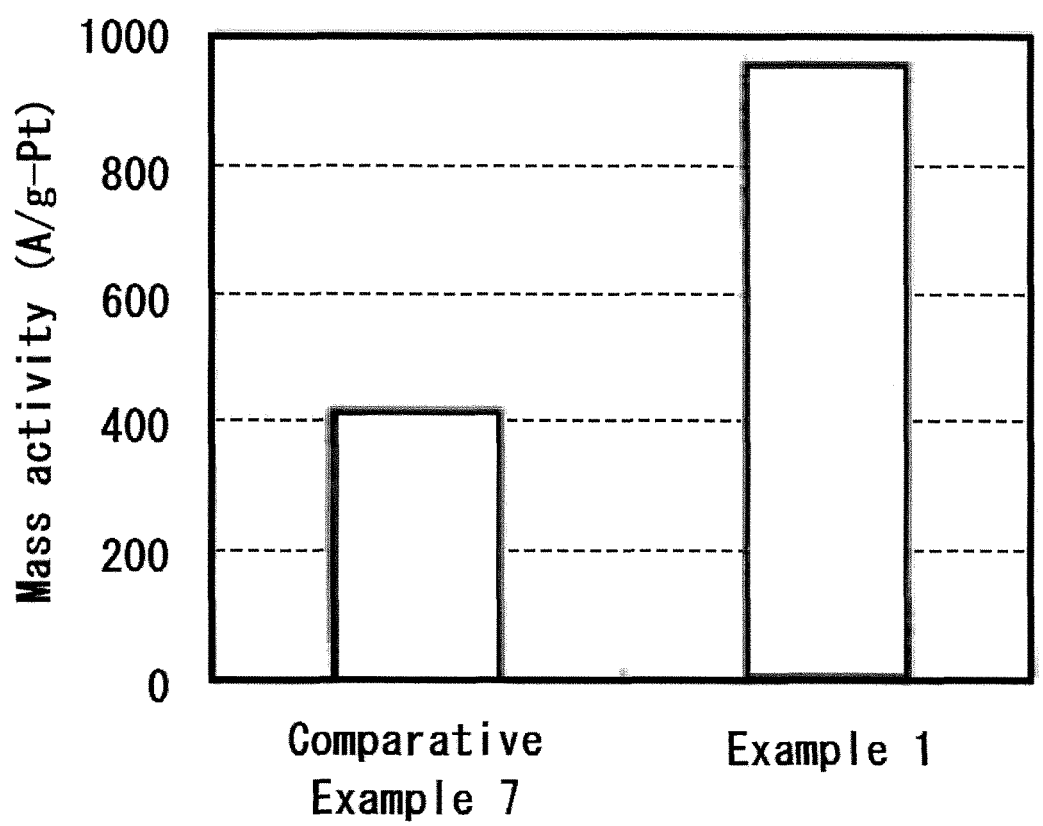
FIG. 9 is a bar graph comparing the mass activities of Example 1 and Comparative Example 7.

FIG. 9 is a bar graph comparing the mass activities of Example 1 and Comparative Example 7. As is clear from FIG. 9, the mass activity of Example 1 is more than twice the mass activity of Comparative Example 7. Therefore, it is clear that by the potential applying step of the present invention, the arrangement of the palladium atoms on the fine palladium particle surface is modified, and the growth of the Pd{111} surface is promoted; therefore, the mass activity of the thus-obtained carbon-supported catalyst is dramatically increased.

As shown in Table 1, in Examples 1 to 3, the fine palladium particles having an average particle diameter of 5.2 nm or 3.8 nm were used, and the potential applying step was carried out by setting the upper limit of the potential to 1.2 V (vs. RHE) or 1.4 V (vs. RHE). As a result, the peak indicating the Pd{111} surface in the reduction wave of the cyclic voltammogram became larger than the peak indicating the Pd{110} surface and the peak indicating the Pd{100} surface. The carbon-supported catalysts of Examples 1 to 3 obtained through the potential applying step in such a condition, resulted in a mass activity of 870 (A/g-Pt) or more, and this is a mass activity higher than ever before.

As just described, the carbon-supported catalyst with better catalytic performance than ever before can be obtained by the production method of the present invention, in which the fine palladium-containing particles having an average particle diameter of 3.0 nm or more and 6.0 nm or less are used and, in the potential applying step, the potential is applied to the fine palladium-containing particles until the peak indicating the Pd{111} surface in the reduction wave of the cyclic voltammogram becomes larger than the peak indicating the Pd{110} surface and the peak indicating the Pd{100} surface.

REFERENCE SIGNS LIST

1. Glass cell
2. Electrolyte
3. Dispersion
4. Working electrode
5. Reference electrode
6. Counter electrode
7. Gas inlet tube
8. Bubbles
11. Reaction container
12. Carbon-supported palladium (Pd/C)
13. Acid solution
14. Reference electrode
15. Counter electrode
16. Compartment for counter electrode
17. Stirrer bar
100, 200. Electrochemical device

The invention claimed is:

1. A method for producing fine catalyst particles comprising a fine palladium-containing particle and a platinum-containing outermost layer covering at least part of the fine palladium-containing particle,
wherein the method comprises:
a potential applying step of applying a potential to the fine palladium-containing particles in a first dispersion comprising fine palladium-containing particles being dispersed in an acid solution and having an average particle diameter of 3.0 nm or more and 6.0 nm or less, until a peak indicating a Pd{111} surface in a reduction wave of a cyclic voltammogram becomes larger than a peak indicating a Pd{110} or Pd{100} surface in the reduction wave of the cyclic voltammogram;
a copper covering step of covering at least part of the fine palladium-containing particle with copper by preparing a second dispersion by mixing the first dispersion and a copper-containing solution after the potential applying step, and applying a potential that is nobler than the oxidation-reduction potential of copper to the fine palladium-containing particles in the second dispersion; and
a platinum covering step of covering at least part of the fine palladium-containing particle with platinum by substituting the copper covering at least part of the fine palladium-containing particle with platinum by mixing the second dispersion and a platinum-containing solution after the copper covering step.

2. The method for producing the fine catalyst particles according to claim 1, wherein the potential is swept in a range including at least 1.2 V (vs. RHE) in the potential applying step.

3. A method for producing a carbon-supported catalyst in which the fine catalyst particles produced by the method of claim 1 are supported on a carbon support,
wherein fine palladium-containing particles configured for use in the potential applying step are supported on a carbon support.

* * * * *